April 18, 1961  W. STELZER  2,980,469
TRACTOR-TRAILER BRAKE SYSTEM
Filed Sept. 2, 1959  2 Sheets-Sheet 1
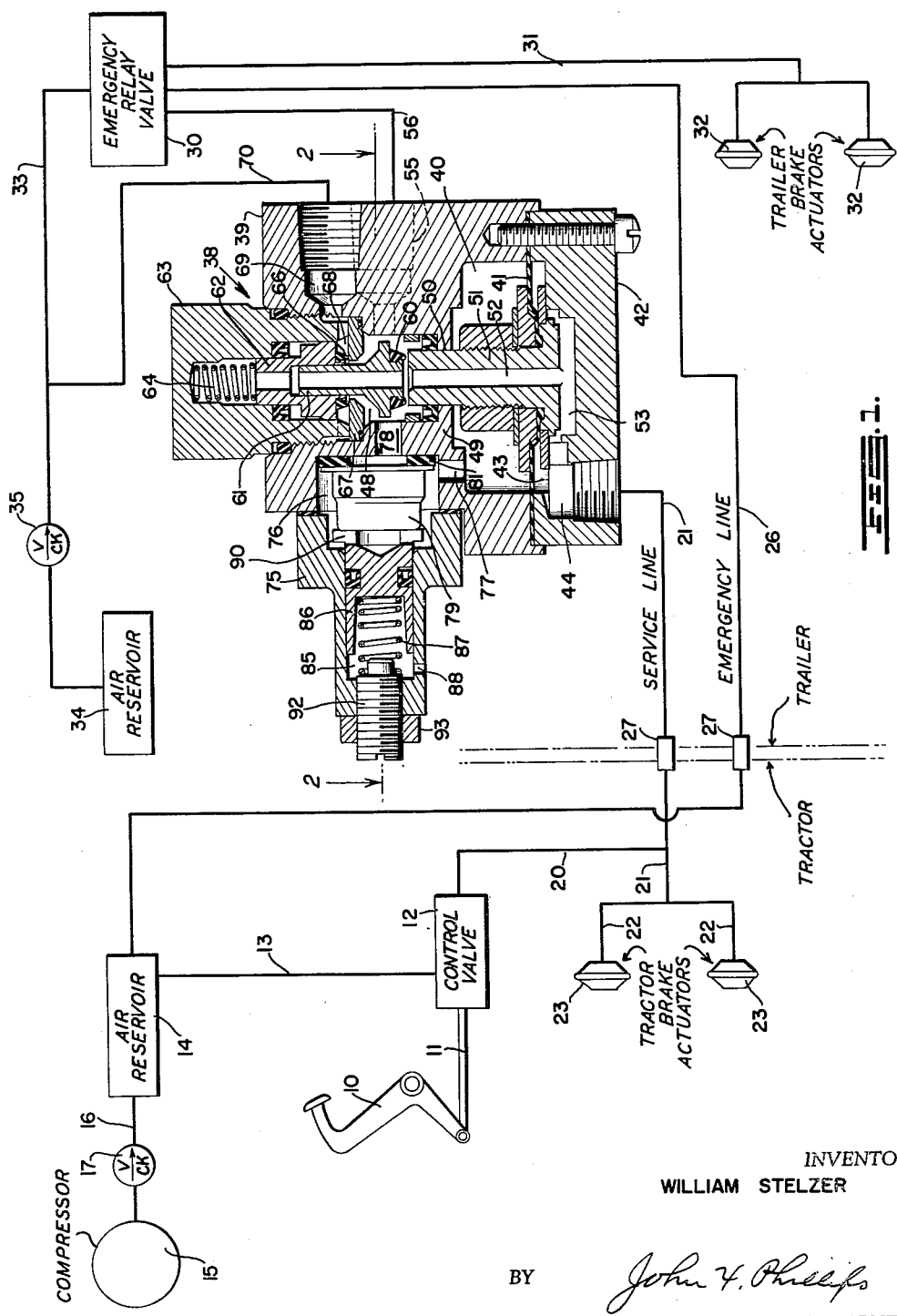
INVENTOR
WILLIAM STELZER
BY John F. Phillips
ATTORNEY April 18, 1961 W. STELZER 2,980,469
TRACTOR-TRAILER BRAKE SYSTEM
Filed Sept. 2, 1959 2 Sheets-Sheet 2
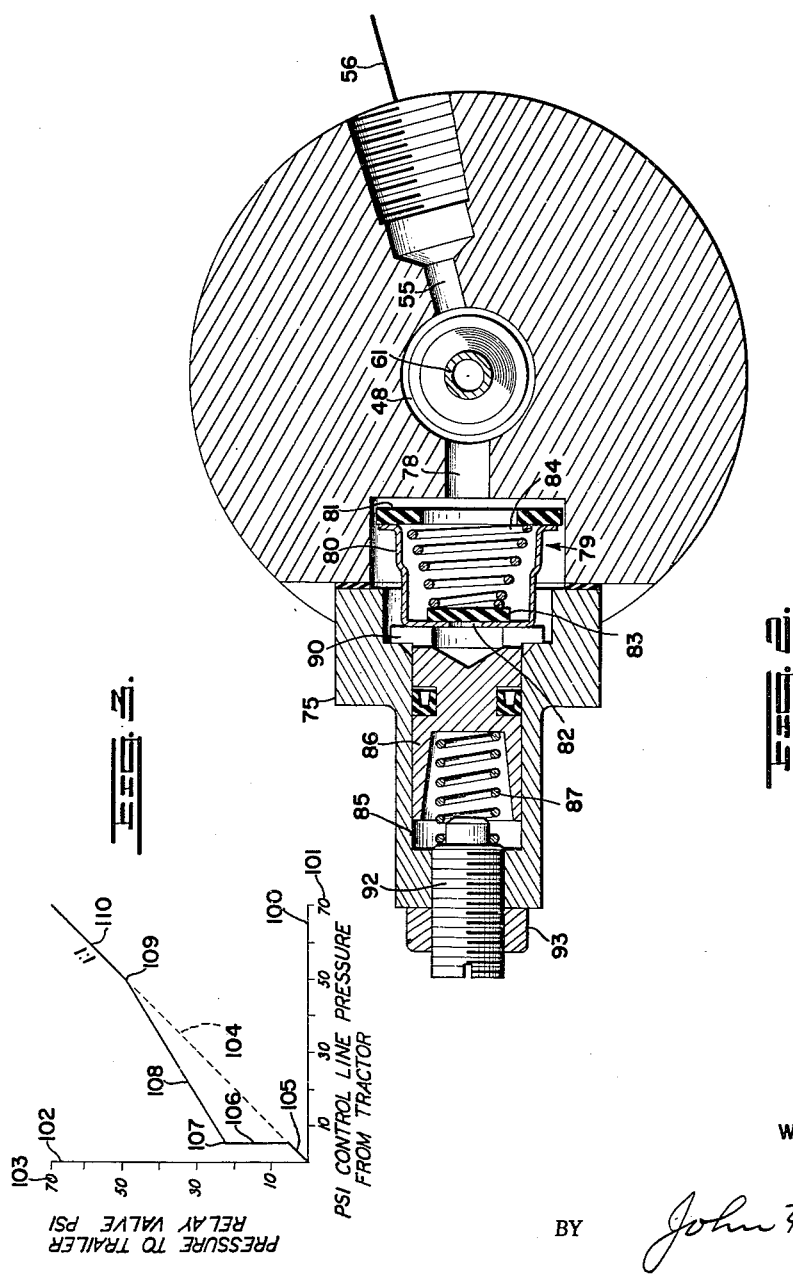
INVENTOR
WILLIAM STELZER
BY John F. Phillips
ATTORNEY

United States Patent Office 2,980,469
Patented Apr. 18, 1961

2,980,469

TRACTOR-TRAILER BRAKE SYSTEM

William Stelzer, Bloomfield Hills, Mich., assignor to Kelsey-Hayes Company, Detroit, Mich., a corporation of Delaware Filed Sept. 2, 1959, Ser. No. 837,744

14 Claims. (Cl. 303—29)

This invention relates to a tractor-trailer brake system, and has particular reference to a pressure amplifying valve for use in the system for utilizing relatively weak impulses in the service line for providing a rapid initial operation of the trailer brakes. This application is an improvement over the construction shown in my copending application Serial No. 836,109, filed August 26, 1959.

It is well known in conventional tractor-trailer brake systems that operation of the tractor brakes takes place appreciably ahead of the operation of the trailer brakes due to the interval of time necessary for pressure impulses in the service line to affect the trailer relay or emergency valve. This lagging of the operation of the trailer brakes is highly disadvantageous since it results in jackknifing. Moreover, because of such disadvantageous operation, it is the common practice to provide the tractor with a hand valve for controlling the trailer brakes so that the operator can snub the trailer brakes only, when desired, or initiate the operation of the trailer brakes ahead of the tractor brakes when the latter are to be applied, thus insuring initial operation of the trailer brakes ahead of the tractor brakes.

In my copending application referred to I have shown an auxiliary type of valve mechanism interposed in the service line between the truck and the relay valve which controls the trailer brakes. Such auxiliary valve functions under the influence of weak impulses in the service line to connect the trailer pressure source to the relay valve mechanism to secure an application of the trailer brakes very quickly and to an extent greater than the application of the tractor brakes. In fact, the mechanism is so sensitive to weak impulses in the service line as to provide substantial trailer brake actuation while only slightly energizing the tractor brake actuators. Thus the necessity for a hand brake is eliminated and operation of the trailer brakes at least as early as the tractor brakes is assured in normal operation of the brake pedal.

An important object of the present invention is to provide a system which effects trailer brake operation under the same conditions as in my copending application but wherein the structure is simplified and rendered more positive and sensitive in operation.

A further object is to provide such a mechanism wherein any tendency for the valve elements of the auxiliary valve mechanism to dwell in lap position is eliminated, thus eliminating the need for a check valved bypass line to overcome this slight disadvantage in my copending application referred to, the pressure in the service line promptly and smoothly taking over the control of the emergency relay valve when pressures in the ends of the service line reach a 1:1 ratio, after which the trailer brakes are controlled strictly proportionally to the control of the tractor brakes.

A further object is to provide such a system having an auxiliary valve mechanism of the type referred to, provided with pressure chambers on opposite sides of a diaphragm for controlling the operation of the device and wherein said parts of the prior system shown in my copending application are eliminated while providing for a more sensitive and accurate operation of the diaphragm to control the valve elements of the auxiliary valve mechanism.

A further object is to provide an auxiliary valve mechanism of the character referred to wherein an inlet chamber from which pressure is supplied to the relay valve is connected by a bypass to a pressure chamber on one side of the operating diaphragm and wherein pressure in the latter chamber duplicates pressure in the inlet chamber when pressure in such chamber increases to a predetermined point, thus preventing a drop in pressure in the pressure chamber connected to the bypass to provide a more accurate and sensitive operation of the mechanism.

Other objects and advantages of the invention will become apparent during the course of the following description.

In the drawings I have shown one embodiment of the invention. In this showing:

Figure 1 is a diagrammatic view of the tractor-trailer brake system, the auxiliary valve mechanism being structurally shown in section;

Figure 2 is an enlarged sectional view on line 2—2 of Figure 1; and

Figure 3 is a small diagrammatic view showing the relative pressures in the forward and rear ends of the service line at different stages of trailer brake operation.

Referring to Figure 1, a tractor brake pedal 10 is connected as at 11 to a suitable control valve mechanism 12 of the follow-up type to which super-atmospheric pressure is supplied through a line 13 from a reservoir 14 on the tractor. Pressure is supplied to the reservoir 14 by a compressor 15 connected thereto by a line 16 having a check valve 17 therein.

The control valve mechanism 12 is connected by a line 20 to the forward end of a service line 21 branched as at 22 for connection to conventional tractor brake actuators 23. The valve mechanism 12 is conventional, and operation of the brake pedal 10 disconnects the line 20 from the atmosphere and connects it to the line 13 to energize the actuators 23.

The tractor-trailer is provided with the usual emergency line 26 connected at its forward end to the reservoir. The service line 21 and emergency line 26 are provided with the usual couplings 27 between the tractor and trailer. The emergency line 26 is connected at its rear end to an emergency relay valve 30 on the trailer, such valve being conventional and having a fluid line 31 leading to trailer brake actuators 32 of conventional type. Air pressure is supplied to the relay valve 30 through a line 33 connected to an air reservoir 34 on the trailer and having therein a check valve 35.

The auxiliary valve mechanism forming the principal subject matter of the present invention is indicated as a whole by the numeral 38. This valve mechanism comprises a preferably cast body 39 having a chamber 40 in the bottom thereof closed by a diaphragm 41 fixed in position by a cap 42 forming beneath the diaphragm 41 a chamber 43. The cap 42 is provided with a port 44 connected to the service line 21 as shown.

The body 39 is provided therein with an inlet chamber 48 divided from the chamber 40 by a wall 49 having an opening 50 therethrough. The diaphragm 41 carries a stem 51 slidable through the opening 50 and provided therethrough with a passage 52 communicating at its lower end with a downwardly recessed portion 53 of the chamber 43.

The inlet chamber 48 (Figure 2) communicates through a port 55 with a line 56 leading to the emergency valve 30 and forming in effect a part of the service line. In fact, the arrangement of the valve 38 is such that it divides the service line to form a primary pressure line leading from the tractor and a secondary pressure line 56 leading to the relay valve 30. It will be apparent that any pressure in the chamber 48 will be communicated to the relay valve 30 to control the admission of pressure through line 31 to the trailer brake actuators.

The upper end of the stem 51 forms a seat engageable by a valve 60 carried by a stem 61 having a pressed fit in an upper body 62 slidable in a recess in the lower end of a nut 63 and biased downwardly by a spring 64. The upper body 62 is provided at the lower end thereof with a valve 66 engageable with a seat 67 arranged in the body 39 and held in position by the nut 63. A space 68 beneath the upper body 62 is adapted to communicate with the chamber 48 when the valve 66 is open. Such space communicates through a port 69 with a line 70 tapped into the line 33 as shown in Figure 1, and accordingly pressure from the source 34 is always supplied to the chamber 68.

A body 75 is fixed in any suitable manner against one side of the body 39 and these two bodies cooperate to form therewithin a chamber 76 cooperating with a port 77 communicating between the chambers 76 and 40 and with a port 78 between chambers 48 and 76 to form a bypass between the chambers 40 and 48 for a purpose to be described. A two-way check valve 79 is arranged in the bypass chamber 76. This check valve may be similar to or identical with a conventional residual pressure valve employed in conjunction with the master cylinders of hydraulic brake systems. The check valve comprises a shell 80 having an open end against which is arranged a resilient valve 81 normally closing the passage 78 connected between the chambers 48 and 76. The closed end of the shell 80 is provided with a port 82 against which seats a rubber valve 83 biased to closed position by a spring 84. It will be apparent that the valve 81 opens under certain conditions to bypass pressure from the chamber 48 to the chamber 40 while the valve 83 opens under certain conditions to bypass pressure fluid from the chamber 40 into the chamber 48.

The body 75 is provided with a cylinder 85 in which is arranged a sealed plunger 86 spring-pressed to the right in Figures 1 and 2 by a spring 87. The cylinder 85 is vented to the atmosphere as at 88. The right-hand end of the plunger 86 is notched as at 90 and seats against the adjacent end of the shell 80 and the spring 87, biasing the plunger 86 to the right in Figure 1, tends to maintain the valve 81 closed. One end of the spring 87 seats against a screw 92 having a lock nut 93. The lock nut 93 may be loosened and the screw 92 turned to vary the loading of the spring 88 and thus determine the pressure in the chamber 48 at which the valve 81 will open.

The valve mechanism 38 functions as described below to supply pressures to the line 56 approximately as indicated in the graph in Figure 3. The axis of abscissas 100 is calibrated as at 101 to indicate p.s.i. in the control line 21 from the tractor. The axis of ordinates 102 is calibrated as at 103 to indicate the p.s.i. in the line 56 leading to the relay valve 30. The dotted line 104 represents the progressive and uniform increase in pressures in the line 56 in accordance with progressively increasing pressures in the line 21 without the use of the present auxiliary valve mechanism. With such mecahnism, however, initial increase in pressure in the control line 21 is reflected in an increase in pressure in the line 56, as at 105, and after the first increment of movement of the brake pedal, the pressure in the line 56 rapidly increases as indicated by the line 106 until a predetermined point 107 is reached, after which pressure increases in the line 56 occur as indicated at 108, the increase being progressive until a predetermined point 109 is reached, with the increase in pressure at a rate lower than the rate of increase indicated by the line 106. Thereafter, pressure increases occur as at 110. It will be noted that a pressure increase without the present invention, as at 104, would occur through the presence of pressure in the lines 21 and 56 at a ratio of 1:1. When the pressure as indicated by the line 108 reaches the point 109, such 1:1 ratio is reached and the auxiliary valve mechanism passes out of operation as described below. From the point 109 on through the remainder of the brake operation, as indicated by the line 110, the pressure in the line 56 equals the pressure in the line 21.

Operation

The parts normally occupy the positions shown in Figure 1. Assuming that the operator desires merely to snub the trailer brakes, he will depress the brake pedal 10 to a slight extent, sufficient to operate the control valve 12 and thus admit air at relatively low pressure to the lines 20, 21 and 22. At this point, pressure supplied to the actuators 23 will be insufficient to effect any appreciable application of the tractor brakes. Such pressure, however, acting through the line 21, will raise the pressure in the chamber 43 and elevate the diaphragm 41, very little pressure being required for this purpose because of the area of the diaphragm. Upward movement of the diaphragm moves the stem 51 to engage its upper end with the valve 60, thus closing communication between the chambers 43 and 48 through the passage 52. Slight further movement of the stem 51 will "crack" the valve 66 to admit pressure from the source 34 through port 69 into the chamber 48, and such pressure flows through the port 55 (Figure 3) into the line 56 and thus to the emergency relay valve 30. This valve functions to disconnect the line 31 from the atmosphere and admit superatmospheric pressure to the trailer brake actuators to operate them. It will be apparent that pressure thus admitted to the chamber 48 will be substantially higher than pressure in the chamber 43, and it is this pressure which causes a resultant trailer brake operating pressure corresponding to the line 106 in Figure 3. In other words, momentarily there will be a rapid increase in pressure supplied through the line 56.

This sudden increase in pressure is followed by a more gradual increase in pressure as represented by the line 108 in Figure 3, and it will be apparent that between the upper end of the line 105 and the point 109 in Figure 3, the valve mechanism 38 acts as a pressure amplifying valve to effect a substantial operation of the trailer brakes.

When a predetermined pressure has been built up in the chamber 48, the valve 81 will be "cracked" to admit pressure into the chamber 40 to oppose upward movement of the diaphragm 41. Assuming that only a trailer brake snubbing operation is desired, the operator need only depress the brake pedal 10 a short distance which will cause an increase in pressure in the line 56 as represented by the line 106 in Figure 3. The increase in pressure in the chamber 40, due to the opening of the bypass valve 81, opposes further upward movement of the diaphragm 41, if the operator does not further depress the brake pedal, and the increase in pressure in the chamber 40 will move the diaphragm 41 downwardly sufficiently to close the valve 60, thus establishing a lap position of the valves 60 and 66. This condition of trailer brake operation may be maintained as long as desired, or increased, or the brakes may be released. The check valve 81 and its biasing spring 87 constitute a control means operative under the conditions described to bypass to the chamber 40 pressure from the inlet chamber 48. Pressure in the chamber 40 at this time will be limited to a point below the pressure in the inlet chamber 48 due to the action of the spring 87.

Assuming that the operator has thus snubbed the brakes and then desires to release them, he will release the brake pedal 10, thus operating the valve 12 to disconnect the line 20 from the source of pressure and connect it to the atmosphere. Atmospheric pressure will then be established in the chamber 43 and the pressure previously admitted to the chamber 40 will move the diaphragm 41 downwardly to its normal position shown in Figure 1. The chamber 40 will be vented to the chamber 48 past valve 83 (Figure 2) and the chamber 48 will be vented through passage 52 and chamber 43 to the line 21.

Assuming that a greater brake application is desired beyond the point represented by the point 107 in Figure 3, continued depression of the brake pedal will increase the energization of the tractor brake actuators 23 and will increase the pressure in the chamber 43. Pressure will continue to increase in the chamber 48 and some of the pressure will be bypassed into the chamber 40. Up to the point 109, as further described below, however, there will be a drop in pressure through the bypass into the chamber 40 below the pressure in the chamber 48 due to the action of the spring 87. Up to the point 109 in Figure 3, therefore, the pressure in the line 56 increases as at 108 (Figure 3) but at a more gradual rate than occurs during the period of operation indicated by the line 106.

As suggested above, the present mechanism is designed to provide a 1:1 ratio of pressures in the lines 21 and 56 at the point 109 in Figure 3. This point may be reached, for example, when pressure in the chamber 48 is 50 p.s.i. Assuming this to be the case, the spring 87 is designed to be overcome at such pressure. When this point is reached, the spring will be fully compressed and the shoulders adjacent the notch 90 will engage the adjacent shoulder of the member 75 to limit further movement of the plunger 86. From 50 p.s.i. to successively higher pressures in the chamber 48, therefore, the spring 87 will be immobilized and there will be no drop in pressure in bypassing fluid from the chamber 48 to the chamber 40. From there on, therefore, the diaphragm 41 remains in normal position with the valve 66 closed and the valve 60 open. The valve mechanism 38 thereupon becomes inoperative for amplifying pressures in the line 56, the line 21 directly supplying pressure to the line 56 through chamber portion 53, passage 52, chamber 48 and the port 55. Beyond the point 109 (Figure 3) the trailer brakes will be controlled by pressure in the line 56 which is the same as pressure in the line 21, and the trailer brake actuators thus will be energized always to an extent proportional to energization of the tractor brake actuators 23.

With the structure of my copending application referred to above there is always spring pressure biasing to closed position a valve corresponding to the valve 81, and thus there is always a drop in pressure in bypass fluid from the chamber 48 to the chamber 40. This resulted in a slight tendency for valves corresponding to the valves 60 and 66 momentarily to dwell in lap position, thus making it advisable to provide a check valved bypass between the lines 21 and 56. The immobilization of the valve 81 in the present instance in the manner stated eliminates the necessity for bypassing any fluid from the line 21 to the line 56. The structure is also simplified for the reason that it is unnecessary in the present case to provide means for reducing the effective area of the bottom of the diaphragm 41 because of reduced pressure in the chamber 40 relative to pressure in the chamber 48 as in the prior construction referred to. The areas of the two sides of the diaphragm are equal with no drop in pressure in the chamber 40 relative to pressure in the chamber 48, and thus a more accurate and sensitive operation of the valves of the device is provided.

When the brake pedal is released, the same operation takes place as when releasing the trailer brakes after they have been merely snubbed. The restoration of atmospheric pressure in the chamber 43 while pressure still remains in the chamber 40 results in instantaneous downward movement of the diaphragm 41 to open the valve 60 and thus vent the chamber 48 to the atmosphere through the passage 56, chamber portion 53 and line 21, while the chamber 40 will be vented to the chamber 48 past valve 83 (Figure 2).

The screw 92 provides convenient means for adjusting the amplification of pressure in the line 56 in accordance with the loading of the trailer. When the trailer is heavily loaded, the jam nut 93 may be loosened and the screw 92 turned inwardly to increase the loading of the spring 87. Under such conditions, it will require higher pressure in the chamber 48 to open the valve 81, and accordingly, in the resultant graph, the point 109 will be moved upwardly and to the right in Figure 3. Conversely, if a lighter load is being carried, the screw 92 may be turned outwardly to lower the loading of the spring 87, in which case the point 109 (Figure 3) will occur at a point lower and to the left in the graph. In other words, the device is capable of a simple adjustment to cause the point 109 to occur earlier or later according to whether the trailer is relatively lightly or heavily loaded.

From the foregoing, it will be apparent that the present system provides for a quick application of the trailer brakes ahead of appreciable application of the tractor brakes when a substantial movement of the brake pedal 10 takes place. Thus dangerous jackknifing of the trailer is prevented. Moreover, the mechanism provides novel means for snubbing the trailer brakes without the use of a hand valve since it is merely necessary to depress the brake pedal 10 to provide such action. For a substantial brake application, the trailer brakes are almost immediately substantially applied, and because of the gradual increase in pressure after the point 107 (Figure 3) is past, there is a smooth transition from the application of boosted pressure to the point 109 where the pressure in the service line takes over the control of the relay valve 30. The desirable results of the present system are accomplished without the use of additional lines connected between the tractor and trailer, only the conventional service and emergency lines being used.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a remote control pressure operated brake system having a service line to control a portion of the brakes of the system, a relay device interposed in said service line to divide the latter into a primary control line for transmitting controlling pressures to said relay device and a secondary control line to transmit pressures regulated by said relay device, said relay device comprising a body having a pressure responsive member therein forming therewith a first and a second chamber, said first chamber being connected to said primary control line, a valve device operable upon an increase in pressure in said first chamber for admitting pressure from a source to said secondary control line, a bypass for conducting to said second chamber fluid admitted from said source by said valve device, a check valve in said bypass opening away from said source, means biasing said check valve to closed position, and means for rendering said biasing means inoperative when pressure admitted from said source by said valve device increases to a predetermined point so that pressure bypassed to said second chamber will equal pressure supplied to said secondary control line and which pressure in said second chamber will oppose movement of said pressure responsive member by pressure in said first chamber.

2. In a remote control pressure operated brake system having a service line to control a portion of the brakes of the system, a relay device interposed in said service line to divide the latter into a primary control line for transmitting controlling pressures to said relay device and a secondary control line to transmit pressures regulated by said relay device, said relay device comprising a body having a pressure responsive member therein forming therewith a first and a second chamber, said first chamber being connected to said primary control line, a valve device operable upon an increase in pressure in said first chamber for admitting pressure from a source to said secondary control line, a bypass for conducting to said second chamber fluid admitted from said source by said valve device, a check valve in said bypass opening away from said source, means biasing said check valve to closed position, means for rendering said biasing means inoperative when pressure admitted from said source by said valve device increases to a predetermined point so that pressure by passed to said second chamber will equal pressure supplied to said secondary control line and which pressure in said second chamber will oppose movement of said pressure responsive member by pressure in said first chamber, and means for relieving pressure from said second chamber when pressure in said first chamber is relieved.

3. A system according to claim 1 provided with means for varying the loading of said biasing means to vary the predetermined pressure at which said biasing means becomes inoperative.

4. In a remote control pressure operated brake system having a service line to control a portion of the brakes of the system, a relay device interposed in said service line to divide the latter into a primary control line for transmitting controlling pressures to said relay device and a secondary control line to transmit pressures regulated by said relay device, said relay device comprising a body having a pressure responsive member therein forming therewith a first and a second chamber, said first chamber being connected to said primary control line, an inlet chamber in said body, an exhaust valve in said inlet chamber, means carried by said pressure responsive member and normally establishing communication between said inlet chamber and said first chamber and engageable with said valve to close such communication upon movement of said pressure responsive member by pressure in said first chamber, an inlet valve controlling communication between said inlet chamber and a source of pressure, said inlet chamber communicating with said secondary control line, a bypass between said inlet chamber and said second chamber, a check valve in said bypass opening away from said inlet chamber, biasing means tending to hold said check valve closed, and means for rendering said biasing means inoperative when pressure in said inlet chamber increases to a predetermined point to supply through said bypass to said second chamber fluid at the same pressure as exists in said inlet chamber to oppose movement of said pressure responsive member by pressure in said first chamber.

5. In a remote control pressure operated brake system having a service line to control a portion of the brakes of the system, a relay device interposed in said service line to divide the latter into a primary control line for transmitting controlling pressures to said relay device and a secondary control line to transmit pressures regulated by said relay device, said relay device comprising a body having a pressure responsive member therein forming therewith a first and a second chamber, said first chamber being connected to said primary control line, an inlet chamber in said body, an exhaust valve in said inlet chamber, means carried by said pressure responsive member and normally establishing communication between said inlet chamber and said first chamber and engageable with said valve to close such communication upon movement of said pressure responsive member by pressure in said first chamber, an inlet valve controlling communication between said inlet chamber and a source of pressure, said inlet chamber communicating with said secondary control line, a bypass between said inlet chamber and said second chamber, a check valve in said bypass opening away from said inlet chamber, biasing means tending to hold said check valve closed, means for rendering said biasing means inoperative when pressure in said inlet chamber increases to a predetermined point to supply through said bypass to said second chamber fluid at the same pressure as exists in said inlet chamber to oppose movement of said pressure responsive member by pressure in said first chamber, and means operative upon the opening of said exhaust valve by pressure in said second chamber for relieving pressure from said second chamber to said inlet chamber.

6. A system according to claim 5 provided with means for varying the loading of said biasing means to vary the predetermined pressure in said inlet chamber at which said means for rendering said biasing means inoperative becomes operative.

7. In a remote control pressure operated brake system having a service line to control a portion of the brakes of the system, a relay device interposed in said service line to divide the latter into a primary control line for transmitting controlling pressures to said relay device and a secondary control line to transmit pressures regulated by said relay device, said relay device comprising a body having a pressure responsive member therein forming therewith a first and a second chamber, said first chamber being connected to said primary control line, a valve device operable upon an increase in pressure in said first chamber for admitting pressure from a source to said secondary control line, a bypass for conducting to said second chamber fluid admitted from said source by said valve device, a check valve in said bypass opening away from said source, a pressure movable element exposed to pressure in said bypass and engaging said check valve, and spring means engaging said pressure movable element to bias it to a normal position closing said check valve, said pressure movable element and said check valve forming a control unit having a portion engageable with said body to limit movement of said check valve from open position whereby, when pressure admitted from said source reaches a predetermined point, said biasing means will be rendered inoperative and pressure admitted from said source will flow through said bypass and build up in said second chamber a pressure equal to pressure admitted from said source to oppose movement of said pressure responsive member by pressure in said first chamber.

8. In a remote control pressure operated brake system having a service line to control a portion of the brakes of the system, a relay device interposed in said service line to divide the latter into a primary control line for transmitting controlling pressures to said relay device and a secondary control line to transmit pressures regulated by said relay device, said relay device comprising a body having a pressure responsive member therein forming therewith a first and a second chamber, said first chamber being connected to said primary control line, a valve device operable upon an increase in pressure in said first chamber for admitting pressure from a source to said secondary control line, a bypass for conducting to said second chamber fluid admitted from said source by said valve device, a check valve in said bypass opening away from said source, a pressure movable element exposed to pressure in said bypass and engaging said check valve, spring means engaging said pressure movable element to bias it to a normal position closing said check valve, said pressure movable element and said check valve forming a control unit having a portion engageable with said body to limit movement of said check valve from open position whereby, when pressure admitted from said source reaches a predetermined point, said biasing means will be rendered inoperative and pressure admitted from said source will flow through said bypass and build up in said second chamber a pressure equal to pressure admitted from said source to oppose movement of said pressure responsive member by pressure in said first chamber, and means for relieving pressure from said second chamber when pressure in said first chamber is relieved.

9. In a remote control pressure operated brake system having a service line to control a portion of the brakes of the system, a relay device interposed in said service line to divide the latter into a primary control line for transmitting controlling pressures to said relay device and a secondary control line to transmit pressures regulated by said relay device, said relay device comprising a body having a pressure responsive member therein forming therewith a first and a second chamber, said first chamber being connected to said primary control line, an inlet chamber in said body, an exhaust valve in said inlet chamber, means carried by said pressure responsive member and normally establishing communication between said inlet chamber and said first chamber and engageable with said valve to close such communication upon movement of said pressure responsive member by pressure in said first chamber, an inlet valve controlling communication between said inlet chamber and a source of pressure, said inlet chamber communicating with said secondary control line, a bypass between said inlet chamber and said second chamber, a check valve in said bypass opening away from said inlet chamber, a plunger engaging said check valve and forming therewith a pressure movable unit movable upon an increase in pressure in said inlet chamber, a spring engaging said plunger to bias said unit to a position closing said check valve, and means for limiting movement of said unit away from said inlet chamber when pressure therein reaches a predetermined point whereby said spring becomes inoperative and pressure bypassed into said second chamber will equal pressure in said inlet chamber and will oppose movement of said pressure responsive member by pressure in said first chamber.

10. A system according to claim 9 provided with means for varying the loading of said biasing means to determine the pressure in said inlet chamber at which said biasing means becomes inoperative.

11. A system according to claim 9 provided with means operative incident to the opening of said exhaust valve by movement of said pressure responsive member by pressure in said second chamber for relieving pressure from said second chamber to said inlet chamber.

12. A system according to claim 9 provided with means for varying the loading of said biasing means to determine the pressure in said inlet chamber at which said biasing means becomes inoperative, and means operative incident to the opening of said exhaust valve by movement of said pressure responsive member by pressure in said second chamber for relieving pressure from said second chamber to said inlet chamber.

13. In a remote control pressure operated brake system having a service line to control a portion of the brakes of the system, a relay device interposed in said service line to divide the latter into a primary control line for transmitting controlling pressures to said relay device and a secondary control line to transmit pressures regulated by said relay device, said relay device comprising a body having a pressure responsive member forming therewith a first and a second chamber, said first chamber being connected to said primary control line, a valve device operable upon an increase in pressure in said first chamber relative to pressure in said second chamber for admitting pressure from a source to said secondary control line, control means operative upon an increase in pressure admitted from said source to said secondary control line by said valve device for admitting such pressure to said second chamber and for limiting pressure in said second chamber to a pressure lower than the pressure admitted from said source by said valve device, to oppose movement of said pressure responsive member by pressure in said first chamber, and means operative after pressure admitted from said source by said valve device increases above a predetermined point for rendering said control means inoperative for limiting pressures in said second chamber whereby there will be established in said second chamber a pressure equal to the pressure admitted from said source by said valve device.

14. A system according to claim 13 provided with means for varying the predetermined pressure at which said last-named means becomes operative.

References Cited in the file of this patent

UNITED STATES PATENTS 2,215,172    Christensen            Sept. 17, 1940
2,429,194    Price                 Oct. 14, 1947